United States Patent
Zwerner et al.

(10) Patent No.: US 9,630,215 B2
(45) Date of Patent: Apr. 25, 2017

(54) RECONFORMABLE MATERIAL REMOVAL SYSTEM

(71) Applicants: John Stephen Zwerner, Scottsdale, AZ (US); David James Roy Robinson, Friday Harbor, WA (US)

(72) Inventors: John Stephen Zwerner, Scottsdale, AZ (US); David James Roy Robinson, Friday Harbor, WA (US)

(73) Assignees: John S. Zwerner, Scottsdale, AZ (US); David Roy Robinson, Friday Harbor, WA (US)

( * ) Notice: Subject to any disclaimer, the term of this patent is extended or adjusted under 35 U.S.C. 154(b) by 188 days.

(21) Appl. No.: 14/730,793

(22) Filed: Jun. 4, 2015

(65) Prior Publication Data
US 2016/0354811 A1    Dec. 8, 2016

(51) Int. Cl.
*B08B 1/00*      (2006.01)
*A47L 13/08*      (2006.01)
(Continued)

(52) U.S. Cl.
CPC .............. *B08B 1/005* (2013.01); *A47L 13/08* (2013.01); *B08B 1/00* (2013.01); *B44D 3/164* (2013.01);
(Continued)

(58) Field of Classification Search
CPC .. E01H 5/02; E01H 5/06; E01H 5/063; E01H 5/065; B44D 3/162; B44D 3/164;
(Continued)

(56) References Cited

U.S. PATENT DOCUMENTS

| 176,476 | A | * | 4/1876 | Neff | ........................ | A47L 13/08 |
| | | | | | | 15/236.06 |
| 2,655,721 | A | | 10/1953 | Einhorn | | |

(Continued)

FOREIGN PATENT DOCUMENTS

| DE | 388203 | * | 1/1924 |
| EP | 352570 | * | 1/1990 |

(Continued)

OTHER PUBLICATIONS

International Search Report Dated Sep. 12, 2016, International Application No. PCT/US2016/034049.

(Continued)

*Primary Examiner* — Mark Spisich
(74) *Attorney, Agent, or Firm* — Cantor Colburn LLP

(57) ABSTRACT

A re-conformable material removal system comprises a head comprising an axial slot extending from an inner chamber to the exterior thereof. A plurality of material removal blades are arranged in side-by-side relationship and have first, proximal ends disposed in the inner chamber, axially extending blade shafts extending through the axial slot and second, distal ends projecting outwardly from the housing to define a removal edge. A biasing member is disposed within the inner chamber to yieldably bias the blades to a fully extended position through the axial slot; wherein placement of the re-conformable material removal system against a surface results in yielding of the biasing member and movement of the blades into the housing when the surface is uneven, resulting in a conformed edge that is continuously adjustable and conformable to the contour of the surface.

19 Claims, 3 Drawing Sheets

(51) Int. Cl.
*E01H 5/06* (2006.01)
*B44D 3/16* (2006.01)
*E01H 1/00* (2006.01)
*E01H 1/10* (2006.01)
*B60S 3/04* (2006.01)

(52) U.S. Cl.
CPC ............... *E01H 1/00* (2013.01); *E01H 1/108* (2013.01); *E01H 5/062* (2013.01); *B60S 3/045* (2013.01)

(58) Field of Classification Search
CPC . B60S 3/045; B08B 1/005; A47L 1/06; A47L 13/02; A47L 13/022; A47L 13/08; A47L 13/11
USPC .............. 15/236.01, 236.02, 236.05, 236.06, 15/236.08, 236.09, 245, 245.1; 30/169, 30/172; 37/232
See application file for complete search history.

(56) References Cited

U.S. PATENT DOCUMENTS

| | | | |
|---|---|---|---|
| 3,110,919 A * | 11/1963 | Barnby | G03F 7/12 101/120 |
| 3,125,142 A * | 3/1964 | Andersson | B27L 1/08 144/208.4 |
| 3,165,832 A | 1/1965 | Stipcevich | |
| 3,530,578 A | 9/1970 | Katz | |
| 3,800,354 A | 4/1974 | Stephens | |
| 4,112,537 A | 9/1978 | Heuck | |
| 4,601,776 A * | 7/1986 | Kral | B25B 27/00 156/717 |
| 4,958,403 A | 9/1990 | Martin | |
| 5,181,292 A | 1/1993 | Aghachi | |
| 5,255,406 A | 10/1993 | Rood | |
| 5,720,071 A | 2/1998 | Hall | |
| 5,819,443 A * | 10/1998 | Winter | E01H 1/105 172/766 |
| 6,095,318 A | 8/2000 | Brink | |
| 6,311,399 B1 * | 11/2001 | Steelman | B29C 63/0078 30/365 |
| 6,643,888 B2 | 11/2003 | Griffith | |
| 7,469,444 B1 | 12/2008 | Thomas | |
| 2008/0313934 A1 | 12/2008 | Smoljo | |
| 2011/0138566 A1 | 6/2011 | Wang | |

FOREIGN PATENT DOCUMENTS

FR 2789289 * 8/2000
GB 667749 * 3/1952

OTHER PUBLICATIONS

Written Opinion of International Searching Authority Dated Sep. 12, 2016, International Application No. PCT/US2016/034049.

* cited by examiner

RECONFORMABLE MATERIAL REMOVAL SYSTEM

FIELD OF THE INVENTION

The subject of the invention is related to material removal systems for use on flat to uneven surfaces and, more particularly, to a material removal system with continuously adjustable surface contour compensation.

BACKGROUND

The removal of material from surfaces is a common activity in virtually every industry. Whether it be removal of paint, corrosion or dirt from a variety of surfaces and materials, cooking residue from barbeque grills or snow and water from road surfaces (to name just a few examples) material removers typically suffer from a common shortcoming; the inability to continuously and dynamically adjust to changes in the surface contour from which the material is being removed.

SUMMARY OF THE INVENTION

In an exemplary embodiment a re-conformable material removal system comprises a head or receiver portion comprising an inner chamber having front and back walls, side walls, a bottom wall comprising an axial slot extending from the inner chamber to the exterior thereof and a top. A plurality of material removal blades, is arranged in side-by-side relationship to one another, having first, proximal ends disposed in the inner chamber of the housing, axially extending blade shafts extending through the axial slot and second, distal ends projecting outwardly from the housing to define a removal edge; and a biasing member disposed within the inner chamber, between each material removal blade and the top, to yieldably bias the material removal blades to a fully extended position through the axial slot and, wherein placement of the re-conformable material removal system against a surface results in yielding of the biasing member and movement of the material removal blades into the inner chamber when the surface is uneven, resulting a conformed removal edge that is continuously adjustable and conformable to the contour of the surface.

In another exemplary embodiment a re-conformable material removal system comprises a head or receiver portion including a housing comprising an axial slot extending from an inner chamber to an exterior thereof. A plurality of material removal blades is arranged in side-by-side relationship to one another, each having first, proximal ends disposed in the inner chamber, axially extending blade shafts extending through the axial slot and second, distal ends projecting outwardly from the housing to define a removal edge. A biasing member is disposed within the chamber to yieldably bias the material removal blades to a fully extended position through the axial slots, wherein placement of the re-conformable material removal system against a surface results in yielding of the biasing member and movement of the material removal blades into the housing when the surface is uneven, resulting a conformed removal edge that is continuously adjustable and conformable to the contour of the surface.

The above features and advantages, and other features and advantages of the invention, are readily apparent from the following detailed description of the invention when taken in connection with the accompanying drawings.

BRIEF DESCRIPTION OF THE DRAWINGS

Other features, advantages and details appear, by way of example only, in the following detailed description of the embodiments, the detailed description referring to the drawings in which.

DESCRIPTION OF THE EMBODIMENTS

Figure 1:
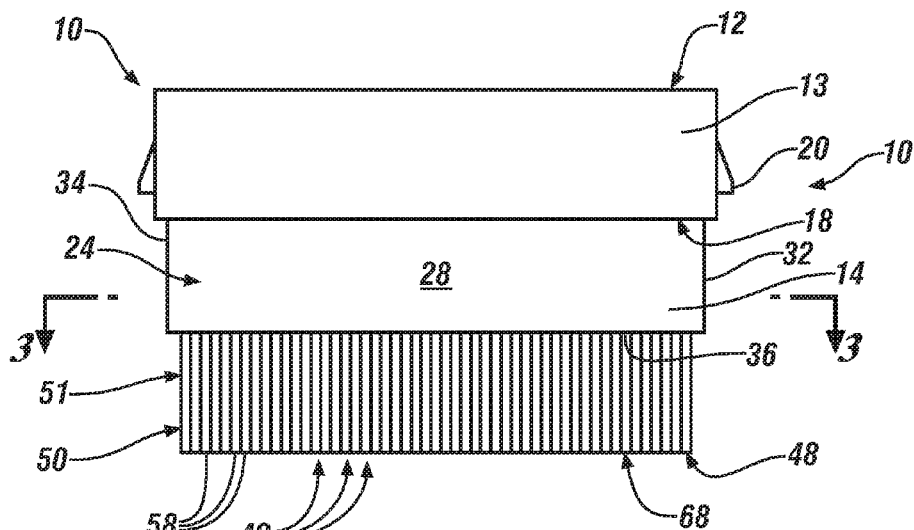
FIG. 1 is a front view of a re-conformable material removal system embodying features of the invention.

The following description is merely exemplary in nature and is not intended to limit the present disclosure, its application or uses. It should be understood that throughout the drawings, corresponding reference numerals indicate like or corresponding parts and features.

Referring now to FIG. 1, in an exemplary embodiment, a re-conformable material removal system 10 is shown. The system 10 may include a head or receiver portion 12. The head or receiver portion 12 is attachable to any number of devices depending on the scaling and application of the material removal system 10. Contemplated applications of this system range from paint and grill scrappers to road snow and water removers for transportation applications. In the embodiments illustrated in FIGS. 1-8, the head or receiver portion 12 is attachable to a mounting shaft or handle 16, FIG. 3.

Figure 2:
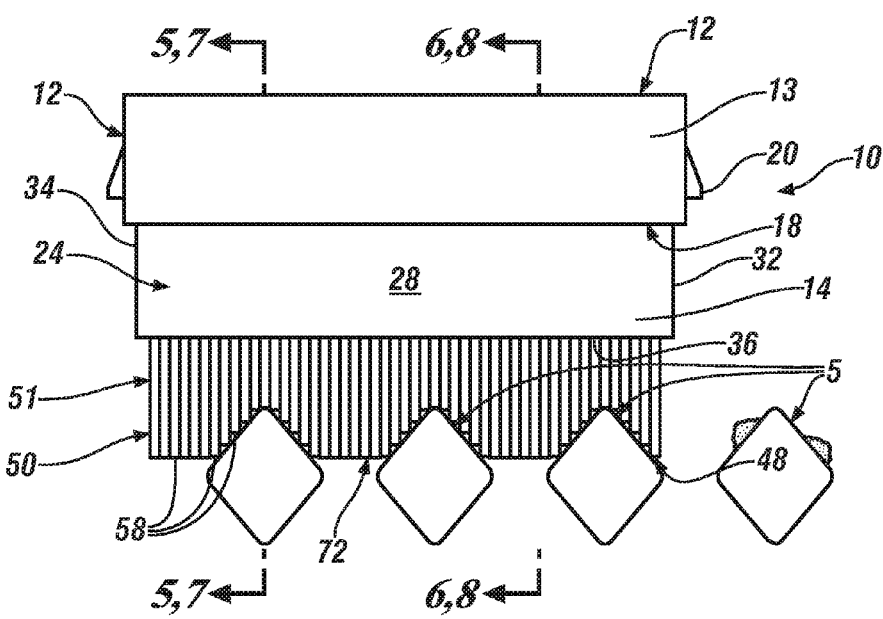
FIG. 2 is another front view of the re-conformable material removal system of FIG. 1.
Figure 3:
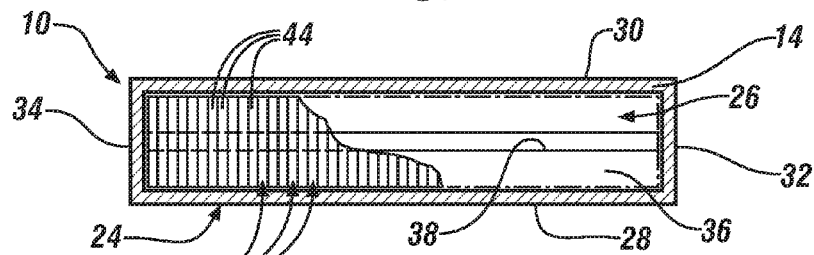
FIG. 3 is a schematic, sectional, plan view of the re-conformable material removal system taken along line 3-3 of FIG. 1.
Figure 4:
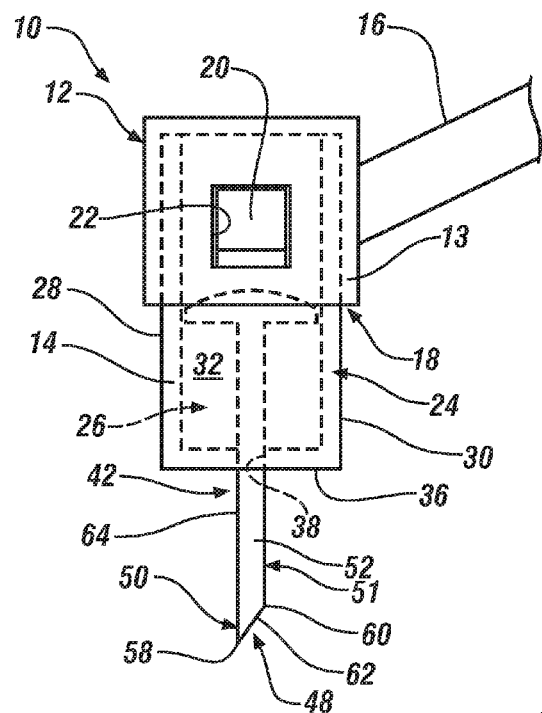
FIG. 4 is a side view of the re-conformable material removal system of FIG. 1.

Referring to FIGS. 2-4, with continuing reference to FIG. 1, in an embodiment, the head or receiver portion 12 is constructed of a rigid material and may include a two piece construction including a top portion 13 that includes an opening 18 configured with dimensions suitable for receiving a bottom portion 14 therein. A locking mechanism, such as locking tab 20 formed on, and extending outwardly from the bottom portion 14 may engage opening 22 to fixedly maintain the two piece head or receiver portion together until separated by a user. It is contemplated that other configurations, such as single piece, may also be used for the head or receiver portion without deviating from the invention disclosed herein.

The bottom portion 14, as described above, includes outer dimensions that facilitate its insertion into the opening 18 in the top portion 13 of the head or receiver portion 12. Bottom portion 14 comprises part of an inner chamber 26 that is bounded by front and back walls 28, 30 and side walls 32, 34, respectively. A bottom wall 36 comprises an axial slot 38 extending from the inner chamber 26 to the exterior thereof. The inner chamber is closed by the top portion 13. In one embodiment, it is envisioned that the bottom portion 14 may comprise a removable and replaceable cartridge assembly.

In the case of a one piece head or receiver portion 12, the inner chamber 26 is bounded virtually entirely by a one piece housing rather than the top and bottom portions 13 and 14, respectively.

In an embodiment, a material removal member 42 may comprise an actuator portion 44 disposed at a first, proximal end 46 and a surface contact portion 48 disposed at a second, distal end 50. The configuration of the material removal member 42 will vary for differing applications of the re-conformable material removal system 10, (ex. such as rounded for burnishing the surface, angled for scraping the surface, and flat for water removal) and the material comprising the material removal member 42 may vary from plastic to steel to brass, rubber or composite and may have a variety of coatings such as carbide, for example. In one limited, exemplary embodiment, an axially extending blade shaft 51 connects the actuator portion 44 with the surface contact portion 48 and may define contact or sliding surfaces 52 on either side thereof. In the embodiment illustrated in FIGS. 5, 6 and 7, the actuator portion comprises an enlarged head 54 which may (optionally) include a curved upper surface 56, to be described in further detail herein. The surface contact portion may include a shaped surface that has geometric proportions that are based on the application, material, durability and construction of both the material removal member 42 and the surface 5 from which material is to be removed, for example. In one exemplary embodiment, the surface contact portion may include a leading edge 58 and a trailing edge 60 interconnected with a sloped surface 62 to define a relatively sharp "cutting" or "scraping" edge at the leading edge. The ratio of the front edge dimension to that of the sliding surface may be chosen to resist twisting or rotation of the blade about its center axis 64 when in use. It is contemplated that the configuration of the surface contact portion 48 may comprise any number of configurations that are chosen based on the removal process to be carried out.

In an exemplary embodiment, a plurality of material removal blades 42 are inserted into the inner chamber 26 such that the axially extending blade shafts 51 extend through the axial slot 38 with the second, distal ends 50 projecting outwardly therefrom. The plurality of material removal blades 42 are arranged in side-by-side relationship to one another such that the contact or sliding surfaces 52 are in sliding contact with one another. The enlarged head 54 of the actuator portion 44 positions each material removal blade 42 within the inner chamber 26 and acts as a stop to prevent the blades from exiting the chamber through the axial slot 38. In the embodiment illustrated, each material removal blade 42 has the same axial length defining a removal edge 68, FIG. 1, formed by the leading edges 58 of the plurality of material removal blades 42.

Figure 5:
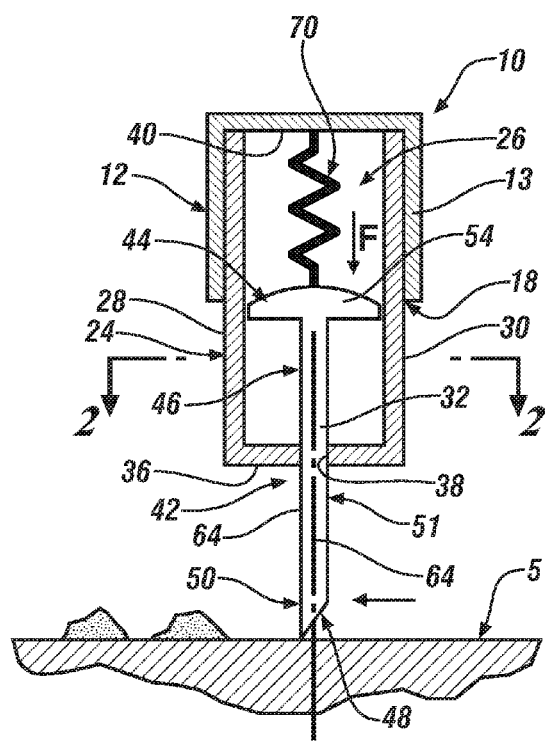
FIG. 5 is a schematic, sectional view of the re-conformable material removal system taken along line 5-5 of FIG. 2.

Referring to FIG. 5, a biasing member 70 is disposed within inner chamber 26 of the head or receiver portion 12 between the actuator portion 44 of each material removal blade 42 and the top wall 40 of the inner chamber 26. The biasing member 70 acts with a force "F" on each material removal blade to yieldably maintain it in the extended position in which, in an embodiment, the enlarged head 54 of the actuator portion 44 is positioned against the bottom wall 36 of the inner chamber 26 with the axially extending blade shaft 51 fully extended through the axial slot 38. Placement of the re-conformable material removal system 10 against a surface 5 may result in yielding of the biasing member 70 if the surface is uneven; resulting in greater upward pressure being exerted by the surface on the removal edge 68 defined by the plurality of material removal blades 42. The result is a conformed removal edge 72, FIG. 2 that is continuously adjustable and conformable to the contour of the surface 5 as the material removal system 10 is moved. When downward force is removed from the system 10 (i.e. when the system is lifted from the surface 5) the biasing member 70 acts on the actuator portion 44 of each material removal blades 42 to return the blades to the fully extended position in which the axially extending blade shafts 51 are fully extended through the axial slot 38.

Figure 6:
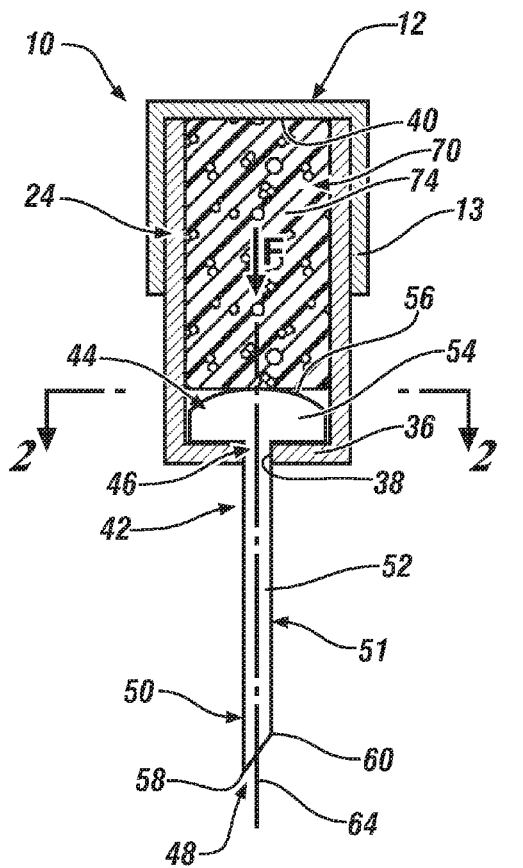
FIG. 6 is a schematic, sectional view of the re-conformable material removal system taken along line 6-6 of FIG. 2.
Figure 7:
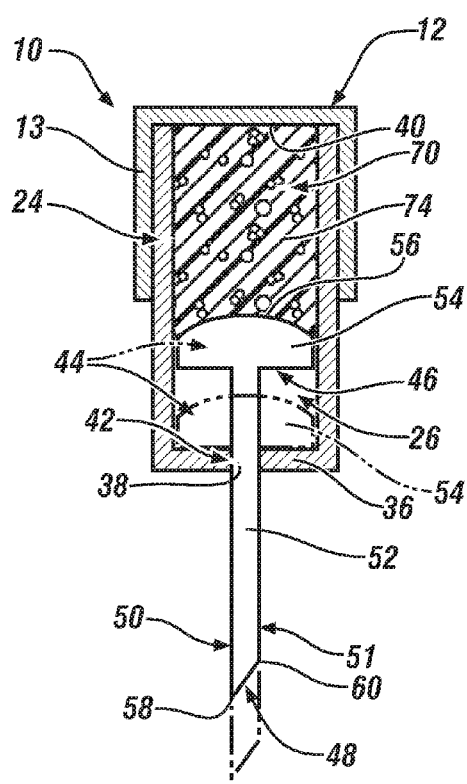
FIG. 7 is a schematic, sectional view of the re-conformable material removal system taken along line 7-7 of FIG. 2.

Referring to FIGS. 6 and 7, in an embodiment, biasing member 70 may comprise a repeatably compressible or elastic material 74 (ex. a solid elastomer, an elastomer of varying density, a pneumatic device, a hydraulic device, a mechanical device or any other suitable material) that enables re-conformable material removal system 10 to function as described herein. In an un-biased state, FIG. 6, such as when the re-conformable material removal system 10 is not in use or is being used on a flat surface, the elastic material 74 acts with a force "F" on each material removal blade 42 to yieldably maintain the blades in the extended position, in which the enlarged heads 54 of the actuator portions 44 are positioned against the bottom wall 36 of the inner chamber 26, with the axially extending blade shafts 51 fully extended through the axial slot 38. Placement of the re-conformable material removal system 10 against a surface 5 may result in yielding or compression of the elastic material 74 if the surface 5 is uneven; resulting in greater upward pressure being exerted by the surface on the removal edge 68 defined by the plurality of material removal blades 42. The result is a conformed front edge 72, FIG. 2, which is continuously adjustable and conformable to the contour of the surface 5 as the material removal system 10 is moved thereacross. When downward force is removed from the system 10 (i.e. when the system is lifted from the surface 5) the repeatedly compressible or elastic material 74 acts on the enlarged head of each material removal blade 42 to return the blades to the fully extended position in which the actuator portion 44 is positioned against the bottom wall 36 of the inner chamber 26 with the axially extending blade shaft 51 fully extended through the axial slot 38, FIG. 1.

Figure 8:
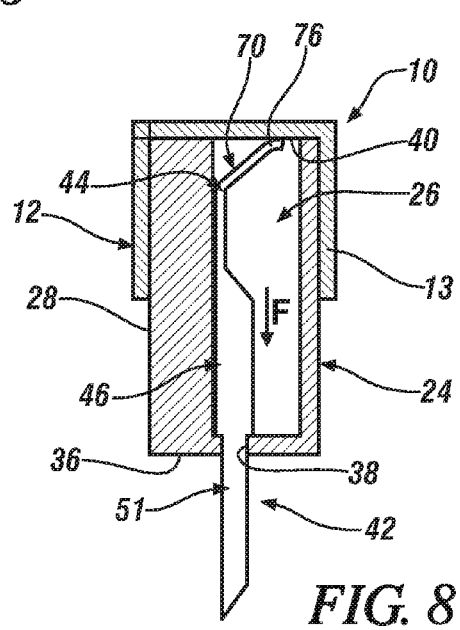
FIG. 8 is a schematic, sectional view of another embodiment of the re-conformable material removal system taken along line 8-8 of FIG. 2.

Referring to FIG. 8, in an embodiment, biasing member 70 may be constructed integrally with each material removal blade 42 as a spring-like tab or extension 76 that projects from the axially extending blade shaft 51, in place of the enlarged head 54 of the actuator portion 44. The spring-like tab or extension 76 contacts the top wall 40 of the inner chamber 26 and is configured with a desired modulus of elasticity that allows it to exert a force "F" on its respective material removal blade to yieldably maintain it in the extended position with the axially extending blade shaft 51 fully extended through the axial slot 38. Placement of the re-conformable material removal system 10 against a surface 5 will result in yielding of the spring-like tab or extension 76 if the surface is uneven; resulting in greater upward pressure being exerted by the surface on the removal edge 68, defined by the plurality of material removal blades 42. The result is a conformed removal edge 72, FIG. 2 that is continuously adjustable and conformable to the contour of the surface 5 as the material removal system 10 is moved. When downward force is removed from the system 10 (i.e. when the system is lifted from the surface 5) the spring-like tab or extension 76 of each material removal blade 42 acts to return the blades to the fully extended position with the axially extending blade shaft 51 fully extended through the axial slot 38, FIG. 1.

As described, in an embodiment, the enlarged head 54 of the material removal blades 42 may include a curved upper surface 56, for instance. The curved surface 56 operates to present a "compatible" surface to the elastomeric material so as not to damage it during cycling of the system 10.

The invention disclosed herein is directed to a re-conformable material removal system 10 that includes a plurality of moveable, side-by-side material removal blades 42 that cooperate to define either a removal edge 68, or a conformable removal edge 72 when applied to an uneven surface 5. It is contemplated that the re-conformable material removal system 10 may be scaled for applications of any size. Envisioned applications include, for example, hand-held paint scrapers, barbeque grill cleaners, industrial metal cleaners and water removers for automotive race tracks. While the invention has been described with reference to exemplary embodiments, it will be understood by those skilled in the art that various changes may be made and equivalents may be substituted for elements thereof without departing from the scope of the invention. In addition, many modifications may be made to adapt a particular situation of material to the teachings of the invention without departing from the essential scope thereof. Therefore, it is intended that the invention not be limited to the particular embodiments disclosed, but that the invention will include all embodiments falling within the scope of the application.

What is claimed is:

1. A re-conformable material removal system comprising:
    a head or receiver portion comprising an inner chamber defined by front and back walls, side walls, a bottom wall comprising an axial slot extending from the inner chamber to the exterior thereof and a top;
    a plurality of material removal blades, arranged in side-by-side relationship to one another, having first, proximal ends disposed in the inner chamber, axially extending blade shafts extending through the axial slot and second, distal ends projecting outwardly from the housing to define a removal edge; and
    a biasing member disposed within the inner chamber between each material removal blade and the top, to yieldably bias the material removal blades to a fully extended position through the axial slot and, wherein placement of the re-conformable material removal system against a surface results in yielding of the biasing member and movement of the material removal blades into the inner chamber when the surface is uneven, resulting in a conformed removal edge that is continuously adjustable and conformable to the contour of the surface.

2. The re-conformable material removal system of claim 1, the head or receiver portion comprising a top portion including an opening configured to receive a bottom portion.

3. The re-conformable material removal system of claim 2, the bottom portion defining a portion of an inner chamber bounded by front and back walls, and side walls wherein the bottom wall comprises the axial slot.

4. The re-conformable material removal system of claim 1, the material removal blades further comprising:
    an actuator portion disposed at a first, proximal end;
    a surface contact portion disposed at a second, distal end; and
    an axially extending blade shaft connecting the actuator portion with the surface contact portion and defining flat, contact or sliding surfaces on either side thereof.

5. The re-conformable material removal system of claim 4, wherein the actuator portion of the material removal blades further comprises an enlarged head defining a stop to prevent the blade from exiting the inner chamber through the axial slot.

6. The re-conformable material removal system of claim 5, wherein the enlarged head includes a curved upper surface operable to present a compatible surface to the biasing member to prevent damage during cycling of the system.

7. The re-conformable material removal system of claim 4, wherein the surface contact portion comprises a shaped surface.

8. The re-conformable material removal system of claim 4, wherein the shaped surface further comprises a leading edge and a trailing edge interconnected with a sloped surface that defines a "cutting" or "scraping" edge.

9. The re-conformable material removal system of claim 4, wherein the axially extending blade shaft comprises a front width that is less than the width of the sliding surfaces.

10. The re-conformable material removal system of claim 4, wherein the biasing member is constructed integrally with the actuator portion.

11. The re-conformable material removal system of claim 10, wherein the biasing member is a spring-like tab or extension that projects from the axially extending blade shaft to contact the top of the inner chamber to yieldably maintain each material removal blade in the extended position with the axially extending blade shaft fully extended through the axial slot.

12. The re-conformable material removal system of claim 1, the biasing member further comprising
    a repeatably compressible or elastic material.

13. The re-conformable material removal system of claim 12, the repeatedly compressible or elastic material comprises a polymer.

14. A re-conformable material removal system comprising
    a head or receiver portion including a housing comprising an axial slot extending from an inner chamber to an exterior thereof;
    a plurality of material removal blades arranged in side-by-side relationship to one another and having first, proximal ends disposed in the inner chamber, axially extending blade shafts extending through the axial slot and second, distal ends projecting outwardly from the housing to define a removal edge; and
    a biasing member disposed within the chamber to yieldably bias the material removal blades to a fully extended position through the axial slot and wherein placement of the re-conformable material removal system against a surface results in yielding of the biasing member and movement of the material removal blades into the housing when the surface is uneven, resulting in a conformed removal edge that is continuously adjustable and conformable to the contour of the surface.

15. The re-conformable material removal system of claim 14, the material removal blades further comprising:
    an actuator portion disposed at the first, proximal end;
    a surface contact portion disposed at the second, distal end; and
    contact or sliding surfaces on either side thereof the axially extending blade shafts.

16. The re-conformable material removal system of claim 15, wherein the actuator portion further comprises an enlarged head that that is acted upon by the biasing member and defines a stop to prevent the material removal blade from exiting the housing through the axial slot.

17. The re-conformable material removal system of claim 15, wherein the biasing member is constructed integrally with each material removal blade.

18. The re-conformable material removal system of claim 17, wherein the biasing member is a spring-like tab or extension that projects from the actuator portion of each material removal blade, to contact a top of the chamber and yieldably maintain each material removal blade in the extended position with the axially extending blade shaft fully extended through the axial slot.

19. The re-conformable material removal system of claim 15, wherein the surface contact portion comprises a shaped surface.

* * * * *